United States Patent [19]

Blomback et al.

[11] 3,884,896
[45] May 20, 1975

[54] NEW SUBSTRATES FOR DIAGNOSTIC USE, WITH HIGH SUSCEPTIBILITY TO THROMBIN AND OTHER PROTEOLYTIC

[75] Inventors: Gustaf Erik Birger Blomback; Margareta Blomback, both of Solna; Karl Goran Claeson; Lars-Gundro Svendsen, both of Goteborg, all of Sweden

[73] Assignee: AB Bofors, Bofors, Sweden

[22] Filed: Apr. 24, 1973

[21] Appl. No.: 354,036

[30] Foreign Application Priority Data
May 2, 1972  Sweden.............................. 5757/72

[52] U.S. Cl. ........... 260/112.5; 195/103.5; 424/177
[51] Int. Cl. .. C07c 105/52; C07g 7/00; A61k 27/00
[58] Field of Search ................................. 260/112.5

[56] References Cited
OTHER PUBLICATIONS

Nachlas et al., Arch. Biochem. Biophys., 108, 266–274, (1964).
Plapinger et al., J. Org. Chem., 30, 1781–1785, (1965).

*Primary Examiner*—Lewis Gotts
*Assistant Examiner*—Reginald J. Suyat
*Attorney, Agent, or Firm*—Pollock, Philpitt & Vande Sande

[57] ABSTRACT

A substrate suitable for diagnostic use, with high susceptibility to proteolytic enzymes of the type peptide peptidohydrolases, such as thrombin, plasmin, trypsin, which substrate is represented by the formula:

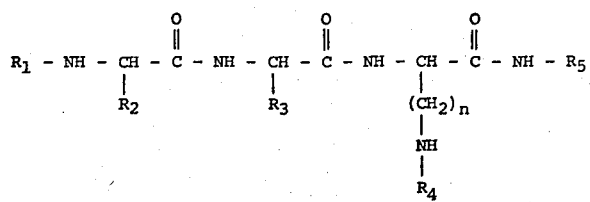

or salts thereof, where $R_1$ is hydrogen, an alkyl-carbonyl having 1–12 carbon atoms, a ω-aminoalkyl-carbonyl having 1–12 carbon atoms in a straight chain, cyclohexyl-carbonyl a ω-cyclohexylalkyl-carbonyl having 1–6 carbon atoms in a straight chain, 4-amino ethyl-cyclohexyl-carbonyl, benzoyl, benzoyl substituted with one or more substituents selected from halogen atoms, methyl, amino and phenyl groups, a ω-phenyl-alkyl-carbonyl having 1–6 carbon atoms in a straight chain, benzenesulphonyl, 4-toluenesulphonyl or N -benzoyl-phenylalanyl; $R_2$ is phenyl, benzyl, 4-hydroxybenzyl, 4-methoxybenzyl or 4-methylbenzyl; $R_3$ is a straight, branched or cyclic alkyl having 3–8 carbon atoms, phenyl, or benzyl; n is 3 or 4; $R_4$ is hydrogen or guanyl; and $R_5$ is phenyl, nitrophenyl, methylnitrophenyl, dinitrophenyl, naphthyl, nitronaphthyl, quinolyl or nitroquinolyl.

21 Claims, No Drawings

NEW SUBSTRATES FOR DIAGNOSTIC USE, WITH HIGH SUSCEPTIBILITY TO THROMBIN AND OTHER PROTEOLYTIC

The present invention relates to new substrates for diagnostic use with high susceptibility to proteolytic enzymes of the type peptide peptidohydrolases. The substrates according to the invention are intended for quantitative determination of classified and hitherto unclassified enzymes of the type E.C. 3.4.4., especially such that break down peptides or proteins in the peptide chain at the carboxylic side of arginine or lysine; e.g., thrombin, trypsin, plasmin, Reptilase from Pentapharm, Basel, Switzerland, Arvine from Ferring AB, Malmo, Sweden and the hitherto unclassified enzyme Brinase from AB Astra, Sodertalje, Sweden. The substrates may further be used for the study of reactions in which such enzymes are formed, inhibited or consumed, and also for the determination of factors which affect or participate in such reactions, for example the determination of proenzymes, activators, antienzymes and enzyme inhibitors.

The Enzyme Nomenclature recommended by The International Union of Biochemistry Elsevier, Amsterdam, 1965 was used in the classification of the enzymes.

Compounds (substrates) which have previously been used for quantitative determination of the above mentioned enzymes are described in "Methoden der enzymatischen Analyse," Vol. I, p. 1023 (Ed. Bergmeyer, H. U., Verlag Chemie, 1970). Depending upon which of the catalytic reactions of the proteolytic enzymes that takes place — the esterolytic or the amidolytic — these synthetic substrates may in principle be divided into two main groups: ester substrates and amide substrates. The largest group of synthetic substrates as previously used is the group of ester substrates. This depends on the fact that these are converted much more rapidly by the peptide peptidohydrolases than the amide substrates hitherto produced. However, the principal biological function of the enzymes classified as peptide peptidohydrolases is, as evident from the name; to hydrolyze peptide or amide bonds, but not ester bonds, of natural substrates. In the literature (Blood Clotting Enzymology, p. 36 and 42 – 44, Ed.: Seegers W. H., Academie Press, 1967) it is reported that the ratio between the reaction velocities of the esterolytic and the amidolytic catalyses of thrombin is not constant under different reaction conditions. For this reason, synthetic amide substrates which have much greater susceptibility to the enzymes in question, and which also more rapidly may be broken down to measurable products that those hitherto known, have been desirable.

In order to study and follow up the reaction course of the enzymatic hydrolysis the amide substrates are particularly suitable since they may give:

a. chromophoric products that are easy to measure spectrophotometrically and have light absorption maxima which do not coincide with those of the original amide substrates;

b. fluorescent products which may be measured by means of fluorescence spectrophotometry;

c. products which, after coupling with a suitable reagent give rise to coupling products which may be photometrically measured with high sensitivity.

Some synthetic amide substrates with hydrolysable chromophoric groups have come into use. These are primarily of the types $N^\alpha$-unsubstituted and $N^\alpha$-substituted mono-aminoacid-p-nitroanilide derivatives and mono amino acid-$\beta$-naphtylamide derivatives. Among these substances $N^\alpha$-benzoyl-DL-arginine-p-nitroanilide hydrochloride (BAPNA) may be mentioned as a reagent for trypsin (E.C. 3.4.4.) and for reactions in which trypsin participates. The enzymatic hydrolysis of this substrate produces the chromophoric product p-nitroaniline, which may readily be measured spectrophotometrically.

However, these earlier known amide substrates do not possess the desired specificity and sensitivity. This is a significant draw-back, which may give rise to a more involved procedure in the taking of specimen, because a considerable amount of biological material will then be required. Furthermore, the enzymatic reaction time is long and the precision of the enzyme determination may be unsatisfactory.

Especially for thrombin there exists no synthetic amide substrate which functions satisfactorily. BAPNA, for example, is mainly used for trypsin, and is not very suitable for thrombin determination since it has a low susceptibility to that enzyme, and because it does not follow the Michaelis - Menten's kinetics. The new substrates of amide type, according to the invention wich have a very high susceptibility to peptide peptidohydrolases are represented by the following general formula:

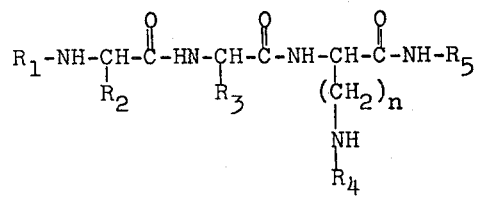

or its salts, where $R_1$ may be selected from hydrogen, an acyl having from 1 to 12 carbon atoms, a $\omega$-aminoacyl having from 1 to 12 carbon atoms, a cyclohexyl carbonyl, a $\omega$-cyclohexyl-acyl, a 4-aminomethyl-cyclohexylcarbonyl, benzoyl, benzoyl substituted with e.g. one or more halogen atoms, methyl-, amino- or phenyl groups etc., a $\omega$-phenyl-acyl having from 1 to 6 carbon atoms in the acyl part and where the phenyl group may be substituted; benzene-sulphonyl, 4-toluene-sulphonyl and $N^\alpha$-benzoyl-phenylalanyl.

$R_2$ may be selected from phenyl, benzyl, 4-hydroxybenzyl, 4-methoxybenzyl and 4-methylbenzyl.

$R_3$ may be selected from a straight, branched or cyclic alkyl group having from 3 to 8 carbon atoms, phenyl and benzyl.

$n$ may be selected from 2, 3 and 4.

$R_4$ may be selected from hydrogen and guanyl.

$R_5$ may be selected from phenyl, nitrophenyl, methylnitrophenyl, dinitrophenyl, naphthyl, nitronaphthyl, quinolyl and nitroquinolyl.

The new substrates may be produced according to two principally different methods.

1. The first method is based upon the coupling of the chromophoric group $R_5$ to the amino acid in question, and then a step-by-step building up of the desired peptide structure by means of gradual coupling of the remaining amino acids. The chromophoric group is here used as a blocking group for the C-terminal carboxyl group of the first amino acid.

2. The other method is based upon a step-by-step building up of the desired peptide structure and upon the subsequent removal of used blocking groups, and finally coupling of the chromophoric group $R_5$ to the peptide structure.

In the stepwise synthesis of the peptide derivatives such coupling methods have been used that are well known and commonly used in the peptide chemistry. Such well known blocking groups, that are commonly used within the peptide chemistry, as for example Cbo (carbobenzoxy), MeOCbo (p-methoxycarbobenzoxy)-NO₂Cbo (p-nitrocarbobenzoxy), MCbo (p-methoxyphenylazo-carbobenzoxy), BOC (tert-butyloxycarbonyl), TFA (trifluoroacetyl) or formyl are used as amino blocking groups. The α-carboxyl group can be activated by means of conversion to different activated, in peptide chemistry well known and often used derivatives, which may either be isolated or be generated in situ, as for example p-nitrophenylester, trichlorophenylester, pentachlorophenylester, N-hydroxysuccinimideester, acid azide, acid anhydride, which may either be symmetric or unsymmetric. It may also be activated with a carbodiimide such as N,N'dicyclohexylcarbodimide. The C-terminal carboxyl group in the amino peptide derivative or the amino acid derivative may be protected by esterifying to e.g. methyl-, ethyl- or isopropylester or by means of conversion to the chromophoric aniline derivative, which thus works as a blocking group during the building up of the peptide chain. Those free functional groups which do not take part in the reaction, may during the synthesis of the peptides or the peptide derivatives be protected in the following manner:

For the purpose of blocking the arginyl δ-guanido group and the lysyl ε-amino group, one may use such amino blocking groups, commonly used within peptide chemistry, as for example NO₂, Tos (p-toluenesulphonyl) or only protonization as protection for the guanido group, and Cbo (carbobenzoxy), BOC (tert. butyloxycarbonyl) or also Tos for the ε-amino-group. As protection for the hydroxyl group in tyrosin one may use such blocking groups, commonly used within the peptide chemistry, as for example benzyl and tertiary butyl protection groups.

In the stepwise synthesis of the peptide structure a systematic purification by means of gel filtration may be carried out after each coupling of a new amino acid. For this gel filtration a column is used which is packed with a material suitable for the gel filtration, e.g., a cross-linked dextran gel of the type Sephadex G or LH from Pharmacia Fine Chemicals, Uppsala, Sweden. Another suitable gel consists of copolymers of vinylacetate, e.g., of the type Merckogel OR-PVA from A G E. Merck, Darmstadt, West-Germany. The gel material is used equilibrated with a suitable solvent and elution is then carried out with the same solvent, e.g. methanol, ethanol, acetone, dimethylformamide, dimethylacetamide, dimethylsulphoxide or hexamethylphosphoric triamide.

The invention will be described more in detail in the following examples which demonstrate the production of different substrates according to the invention by means of stepwise synthesis. However, these examples do not limit the scope of invention.

In the thin layer chromatographic analysis of the eluate and the products glass plates were used with silica gel (F 254 from A G E. Merck, Darmstadt, West-Germany) as absorption medium. For the development of the thin layer chromatograms the following solvent systems have been used:

| A: | n-butanol:acetic acid:water | (3:1:1) |
| C: | n-propanol:ethyl acetate:water | (7:1:2) |
| D: | n-heptane:n-butanol:acetic acid | (3:2:1) |
| P₁: | chloroform:methanol | (9:1) |

After the thin layer chromatographing, the plates were developed first in UV light (254 nm), and subsequently with the chlorine/toluidine reaction (Ref.: G. Pataki: Dunnschluchtchromatografie in der Aminosaure und Peptid-Chemie, Walter de Gruyter and Co., Berlin, 1966, p. 125) as a development method.

Unless otherwise stated all amino acids used have the L-configuration, and the abbreviations have the following meanings:

Arg = Arginine
Ile = Isoleucine
Leu = Leucine
Lys = Lysine
Phe = Phenylalanine
Tyr = Tyrosine
Val = Valine
C-Ph.Gly = C-Phenylglycine Further abbreviations as used in the examples:
Ac = Acetyl
Ac₂O = Acetic anhydride
AcOH = Acetic acid
BOC = tert.-Butyloxycarbonyl
Bz = Benzoyl
Bzl = Benzyl
Bz₂O = Benzoic anhydride
Cbo = Carbobenzoxy
DCCI = Dicyclohexylcarbodiimide
DCHA = Dicyclohexylamine
DCU = Dicyclohexylcarbamide
DMF = Dimethylformamide
Et₃N = Triethylamine
HMPTA = N, N, N',N', N'', N''-hexamethylphosphoric triamide
MCbo = p-Methoxyphenylazocarbobenzoxy
MeOH = Methanol
NA = Naphthylamine
OtBu = tert. -Butyloxy
OEt = Ethyloxy
OMe = Methyloxy
OpNP = p-Nitrophenoxy
OisoPr = iso-Propyloxy
pNA = p-Nitroanilide
TFA = Trifluoroacetyl
Tos = p-Toluenesulphonyl
TLC = Thin layer chromatography The gels Sephadex G-15 and G-25 as used for the gel filtration are both cross-linked dextran with different cross-linking degree from Pharmacia Fine Chemicals, Uppsala, Sweden. The gel Sephadex LH-20 is a hydroxypropylated crosslinked dextran gel from Pharmacia Fine Chemicals, Uppsala, Sweden.

EXAMPLE I $$N^\alpha - Bz - Phe - Val - Arg - pNA \cdot HCl \quad (1)$$

Example 1 a:

Cbo — Arg(NO₂) — pNA (Ia)

1. 35.3 g (0.1 mole) of dry Cbo — Arg(NO₂)—OH were dissolved in 200 ml of dry newly distilled HMTA at room temperature, after which 10.1 g (0.1 mole) of Et₃N and 24.6 g (0.15 mole) of p-nitrophenylisocyanate were added while stirring and under moisture-free conditions. After 24 hours' reaction time at room temperature, the reaction mixture was poured into 2 l of 2% sodium bicarbonate solution while stirring. The precipitate which formed was filtered and washed 3 times with 0.5 l of 2% sodium bicarbonate solution, twice with 0.2 l of distilled water and after that, twice with 0.5 l of 0.5 N hydrochloric acid and finally 5 times with 0.2 l of distilled water. The dried crude product was extracted with warm methanol, and in this way the desired product and some additional byproducts were dissolved. The insoluble residue, consisted of N., N'-bis p-nitrophenylcarbamide, was filtered off and the filtrate was purified on a column containing Sephadex LH-20 equilibrated with MeOH 29.8 g (63.0%) of Ia, mp. 185°-188°C, homogeneous according to TLC and P, and C and $[\alpha]_D^{24}=-1.3°$ (c = 1.1; AcOH).

2. 35.3 (0.1 mmole) of Cbo—Arg(NO₂)—OH (dried) were dissolved in 600 ml of tetrahydrofurane: DMF (1:1). 10.1 g (0.1 mole) of Et₃N were added, after which the solution was cooled to —10°C under moisture-free conditions. 13.7 g (0.1 mole) of isobutyl chloroformate dissolved in 50 ml of tetrahydrofurane were added drop by drop to the cooled mixture during a period of 10 min, and after a further 10 min. interval 16.4 g (0.1 mole) of p-nitroaniline were added. After having reached room temperature, the reaction solution was left for 24 hours. The solvent of the reaction mixture was then distilled off in vacuum, digested 3 – 5 times each with distilled water, 5% sodium bicarbonate, and distilled water, after which the residue was dried in vacuum.

Purification: Recrystallisation twice from MeOH. The mother liquor was gel filtered on Sephadex LH-20 in MeOH.

23.0 g (48.5%) of Ia with the same physical data as in the previous example.

3. 35.3 g (0.1 mole) of Cbo — Arg(NO₂) — OH were dissolved in DMF, the solution was cooled to —10°C, after which 20.6 g (0.1 mole) DCCI and 16.4 g (0.1 mole) p-nitroaniline were added. After 24 hours' reaction time at room temperature the reaction solution was evaporated to dryness and digested 3 – 5 times each with distilled water, 5% sodium bicarbonate solution, distilled water, 0.5 N HCl and distilled water. The residue was dried in vacuum.

Purification: Gel filtration on Sephadex LH-20 in MeOH.

14.7 g (34.0%) of Ia with mp 186°- 188°C, homogeneous according to TLC in P₁ and C and $[\alpha]_D^{24}=-1.38°$ (c = 1.0; AcOH).

Example 1 b:

Cbo — Val — Arg(NO₂) — pNA (Ib)

To 20.6 g (43.5 mmoles) of Ia was added 110 ml of AcOH and 110 ml of 4N HBr in AcOH under moisture-free conditions. The mixture was stirred at room temperature for 60 min. where after it was slowly poured into 750 ml of dry ether, whole being stirred vigorously, resulting in the precipitation of 1.5 HBr . H—Arg(NO₂)—pNA. The ether phase was decanted, the precipitate was further washed 4 times with 250 ml of dry ether in order to remove the benzyl bromide which was formed, and the excess of HBr and AcOH. After drying in vacuum over P₂O₅ the hydrobromide of the amino acid derivative was obtained in a quantitative yield of (20.0 g).

20.0 g (43.5 mmoles) of 1.5 HBr.H—Arg(NO₂)—pNA were dissolved in 150 ml of DMF and cooled to 10°C. 6.60 g (65.2 mmoles) of Et₃N were added in order to liberate H—Arg(NO₂)pNA from the hydrobromide salt. The formed Et₃N.HBr was filtered off and to the filtrate which was cooled to —10°, 20.3 g (54.3 mmoles) of Cbo—Val—OpNP were added. When the reaction solution, after several hours had acquired room temperature, it was again cooled and buffered with 2.2 g (21.7 mmoles) of Et₃N. The buffering procedure was repeated one more time after approximately 3 hours. After a total reaction time of about 24 hours, the reaction mixture was dried in vacuum at 40°C. The residue was digested 3 times with 100 ml distilled water, after which it was dried in 3 times with 100 ml distilled water, after which it was dried in vacuum.

Purification: Recrystallization of the crude material two times from MeOH gave 12.4 g (50%) of pure substance. The mother liquor was purified by means of gel filtration on a column with Sephadex LH-20 equilibrated with MeOH. A fraction which gave a further 10.8 g of pure substance was obtained from the eluate.

Example Ic:

Cbo — Phe — Val — Arg(NO₂) — pNA (Ic)

Starting material: 28.6 g (50 mmoles) of Ib and 31.5 g (75 mmoles) of Cbo—Phe—OpNP.

Method of synthesis: According to example Ib.

Purification: Recrystallization of the crude material 3 times from MeOH gave 14.4 g of pure substance according to TLC in P₁. The mother liquor was purified by means of gel filtering on Sephadex LH-20 in MeOH and this gave 19.6 g of pure substance according to TLC in P₁.

34.0 g (94.4%) of Ic with mp 219.5°-222°C, homogeneous according to TLC in P₁ and $[\alpha]_D^{24}=-17.1°$ (c=1.0; DMF-AcOH; 99:1) were obtained.

Example Id:

N$^\alpha$ — Bz — Phe — Val — Arg(NO₂)—OMe (Id)

Starting material: 30.7 (50 mmoles) of Cbo—Phe—Val—Arg (NO₂)—OMe and 16.0 g (75 mmoles) Bz₂O.

Method of synthesis: Decarbobenzoxylation of Cbo—Phe—Val—Arg(NO₂)—OMe was carried out in the same manner as described in example Ib.

30.0 (50 mmoles) of 1.5 HBr.H—Phe Val–Arg(NO₂)OMe were dissolved in 350 ml of DMF and cooled to —10°, after which 7.6 (75 mmoles) of Et₃N were added. The solution was stirred under moisture-free conditions for 1 hour, after which time the formed Et₃N.HBr was filtered off. The filtrate was cooled to —10°C and 16.0 (75 mmoles) of Bz₂ were added. After a ca. 3 hours reaction time when the solution had acquired room temperature, it was cooled again and buffered with 2.5 g (25 mmoles) of Et₃N. The buffering procedure was repeated one more time after ca. 3 hours. After a total of ca. 24 hours reaction time the solution was evaporated in vacuum. The residue wad digested and dried in accordance with the procedure described in example Ib.

Purification: Gel filtration on Sephadex LH-20 in MeOH.

26.0 g (88.9%) of Id with mp 138°–141°C homogeneous according to TLC in P₁ and D and $[\alpha]_D^{24} = -39.8°$ (c=1; MeOH) were obtained.

Example Ie:

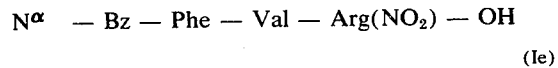

11.7 g (20 mmoles) of Id were dissolved in 200 ml 50% EtOH and 200 ml of 1N KOH/95% EtOH were added. After stirring for 75 min. at room temperature, $CO_2$ gas was passed through the solution until it reached a pH of 7. The solution was evaporated in vacuum to a volume of about 25 ml and then diluted with $H_2O$ to a total volume of 500 ml. The solution was extracted 4 times with EtOAc, after which the aqueous phase was acidified with 1N HCl to a pH of 2.8. The liberated benzoyl-tripeptide acid which precipitated out by the acidification was filtered off and washed many times with distilled water. The substance was dried in vacuum.

Purification: Recrystallization twice from MeOH. The mother liquor was purified by means of a gel filtration on Sephadex LH-20 in MeOH.

10.1 g (88.5%) of Ie in amorphous form, with equiv. weight 555.7 and homogeneous according to TLC in A and C were obtained.

Example If:

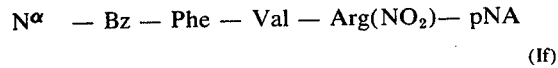

1. Starting material: 7.2 g (10 mmoles) of Ic and 3.4 g (15 mmoles) of Bz₂O.
Method of synthesis: According to example Id.
Purification: Gel filtration on Sephadex LH-20 in MeOH.
5.2 g (75.5%) of If with mp. 236°–237°C, homogeneous according to TLC in P₁ and D and $[\alpha]_D^{24} = -23.0°$ (c=1; DMF), were obtained.

2. Starting material: 5.7 g (10 mmoles) of Ie and 2.46 g (15 mmoles) of p-nitrophenylisocyanate.
Method of synthesis: According to example Ia - 1.
Purification: Gel filtration on Sephadex LH-20 in MeOH.
5.3 g (75.5%) of If with mp. 235°–237°C, homogeneous according to TLC in P₁ and D and $[\alpha]_D^{24} = -22.5°$ (c=1; DMF), were obtained.

Example Ig:

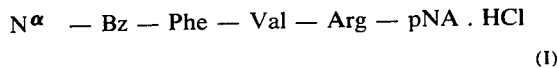

345 mg (0.5 mmole) of If were placed in the reaction vessel of a Sakakibara apparatus. 5 ml of dry hydrogen fluoride were condensed into the vessel. After having been stirred during a reaction time of 1 hour at a temperature of 0°C, the nitro group which protects the guanidine-function had split off. The hydrogen fluoride was then distilled off in vacuum, and the dry residue was dissolved in DMF. In order to transfer the hydrogen fluoride derivative of the peptide to its hydrochloride salt, 0.25 ml of conc. HCl were added to the DMF solution. The solution was evaporated till dryness in vacuum. The converting procedure was repeated one more time. The residue was dissolved in 33% of AcOH.

Purification: Gel filtration on Sephadex G-15 in 33% AcOH.

275 mg (80.7%) of I were obtained after freeze-drying as an amorphous powder with a Cl-content of 5.12%, homogeneous according to TLC in A and $[\alpha]_D^{23} = -43.5°$ (c = 0.69; 50% AcOH).

Amino acid analysis: Val: 1.0; Phe: 1.2; Arg: 0.99.

EXAMPLE II

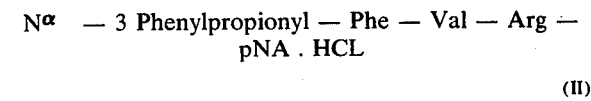

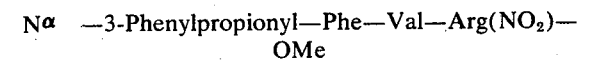

Starting material: 30.7 g (50 mmoles of Cbo—Phe—Val—Arg(NO₂) — OMe and 16.3 g (60 mmoles) of 3 – Phenylpropionyl–OpNP.
Method of synthesis: According to example Ib.
Purification: Gel filtration on Sephadex LH-20 in MeOH 25.2 g (82.5%) of IIa homogeneous according to TLC in P₁ and C were obtained.

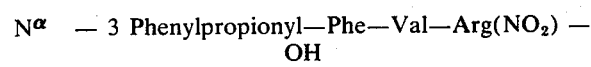

Starting material: 7.1 g (11.5 mmoles) of IIa
Method of synthesis: According to example Ie.
Purification: Gel filtration on Sephadex LH-20 in MeOH.
6.5 g (93.7%) of IIb with e.w. 584.1, homogeneous according to TLC in A and C $[\alpha]_D^{24} = -9.3°$ (c = 1.0; MeOH), were obtained.

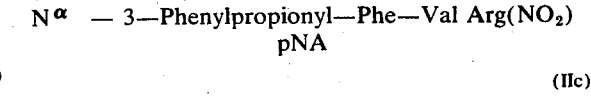

Starting material: 3 g (5 mmoles) of IIb and 1.23 (7.5 mmoles) of p-nitrophenylisocyanate.
Method of synthesis: According to example Ia - 1.
Purification: Gel filtration on Sephadex LH-20 in MeOH.
2.65 g (66.3%) of IIc, homogeneous according to TLC in P₁ were obtained.

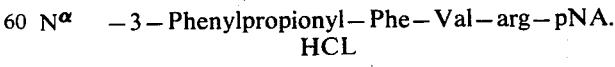

Starting material: 179 mg (0.25 mmole) of IIc.
Method of synthesis: According to example Ig.
Purification: Gel filtration on Sephadex G-15 in 33% AcOH.

45 mg (26.5%) of II were obtained after freeze-drying in amorphous form with a Cl-content of 4.91%, homogeneous according to TLC in A and $[\alpha]_D^{23} = -36.7°$ (c = 0.71; 50% in AcOH).

Amino acid analysis: Val: 1.0; Phe: 1.1; Arg: 0.99.

H—Phe—Val—Arg—pNA . 2 HCL (III)

Starting material: 198 mg (0.28 mmole) of Ic.
Method of synthesis: According to example Ig.
Purification: Gel filtration on Sephadex G-25 in 50% AcOH.

170 mg (61.0%) of amorphous, freeze-dried III with Cl-content 11.37%, homogeneous according to TLC in A and $[\alpha]_D^{23} = -26.3°$ (c=0.61; 50% AcOH), were obtained.

Amino acid analysis: Val: 1.0; Phe: 0.95; Arg: 1.0.

EXAMPLE IV:

H—Phe—Val—Arg—pNA . 2 HCL (IV)

Cbo—Phe—Val—Arg(NO₂)—pNA (IVa)

Starting material: 335 mg (0.46 mmole) of Ic and 317 mg (0,75 mmole) of Cbo—Phe—OpNP.
Method of synthesis: According to example Ib.
Purification: Gel filtration on Sephadex LH-20 in DMF.

282 mg (70.0%) of IVa with mp 201°–204°C, homogeneous according to TLC in P₁ and $[\alpha]_D^{25} = -1.02°$ (c=0.98;DMF), were obtained.

H—Phe—Val—Arg—pNA . HCL (IV)

Starting material: 92.9 mg (0.107 mmole) of IVa.
Method of synthesis: According to example Ig.
Purification: Gel filtration on Sephadex G-25 in 50% AcOH.

59.5 mg (73.1%) amorphous freeze-dried IV with a Cl-content of 9.18%, homogeneous according to TLC in A and $[\alpha]_D^{23} = -19.7°$ (c= 0.76; 50% AcOH), were obtained.

Amino acid analysis: Val: 1,0; Phe: 2.2; Arg: 0.98.

EXAMPLE V:

p—Me—Bz—Phe—Val—Arg—pNA . HCL (V)

p—Me—Bz—Phe—Val—Arg(NO₂)—pNA (Va)

Starting material: 155 mg (0.216 mmole) of Ic and 83.2 mg (0.324 mmole) of p—Me—Bz—OpNP, mp. 169°-172°.
Method of synthesis: According to example Ib.
Purification: Gel filtration on Sephadex LH-20 in MeOH.

69.5 mg (45%) of amorphous Va homogeneous according to TLC in P₁ and $[\alpha]_D^{23} = -26,1°$ (c=0.69; DMF), were obtained.

p—Me—Bz—Phe—Val—Arg—pNA . HCL (V)

Starting material: 68.98 mg (0.0965 mmole) of Va.
Method of synthesis: According to example Ig.
Purification: Gel filtration on Sephadex G-15 in 33% AcOH.

44,5 mg (66%) of amorphous, freeze-dried V with a Cl-content of 5.01%, homogeneous according to TLC in A and $[\alpha]_D^{23} = -40.8°$ (c = 0.70; 50% AcOH), were obtained.

Amino acid analysis: Val: 1.0; Phe: 1.0; Arg: 1.0.

EXAMPLE VI:

$N^\alpha$ —Ac — Phe — Val — Arg — pNA . HCL (VI)

$N^\alpha$ —Ac—Phe—Val—Arg (NO₂)—pNA (VIa)

Starting material: 233 mg (0.33 mmole) of Ic and 41 mg (0.40 mmole) of Ac₂O.
Method of synthesis: According to example Id.
Purification: Gel filtration on Sephadex LH-20 in MeOH.

118 mg (66%) amorphous of VIa, homogeneous according to TLC in P₁ and $[\alpha]_D^{23} = -3.6°$ (c= 1,16; DMF), were obtained.

$N^\alpha$ —Ac—Phe—Val—Arg—pNA . HCL (VI)

Starting material: 116 mg (0.185 mmole) of VIa.
Method of synthesis: According to example Ig.
Purification: Gel filtration on Sephadex G-15 in 20% AcOH.

90 mg (79%) of amorphous, freeze-dried VI with a Cl-content of 5.59%, homogeneous according to TLC in A and $[\alpha]_D^{23} = -21.0°$ (c= 0.62; 50% AcOH), were obtained.

Amino acid analysis: Val: 1.0; Phe: 1.2; Arg: 1.1

EXAMPLE VII:

$N^\alpha$ —n-octanoyl—Phe—Val—Arg—pNA . HCL (VII)

$N^\alpha$ —n-octanoyl—Phe—Val—Arg(NO₂)—pNA (VIIa)

Starting material: 207 mg (0.288 mmole) of Ic and 109 mg (0.41 mmole) of caprylic acid-p-nitrophenylester.
Method of synthesis: According to example Ib.
Purification: Gel filtration on Sephadex LH 20 in MeOH.

172 mg (84% of amorphous VIIa, homogeneous according to TLC in P₁ and $[\alpha]_D^{23} = -6.6°$ (c=0.5; DMF), were obtained.

$N^\alpha$ -n-octanoyl—Phe—Val—Arg—pNA . HCL (VII)

Starting material: 129.4 mg (0.182 mmole) of VIIa.
Method of synthesis: According to example Ig.

Purification: Gel filtration on Sephadex LH-20 in MeOH and Sephadex G-15 in 33% AcOH.

109 mg (85%) of amorphous, freeze-dried VII with a Cl-content of 4.96%, homogeneous according to TLC in A and $[\alpha]_D^{23} = -29.5°$ (c=0.7; 50% AcOH), were obtained.

Amino acid analysis: Val: 1.0; Phe: 1.0; Arg: 0.95.

EXAMPLE VIII $N^\alpha$ -Cyclohexylcarbonyl — Phe — Val — Arg — pNA . HCL (VIII)

$N^\alpha$ -Cyclohexylcarbonyl—Phe—Val—Arg (NO$_2$)—pNA (VIIIa)

Starting material: 233 mg (0.33 mmole) of Ic and 100 mg (0.40 mmole) of Cyclohexylcarboxylic acid -p-nitrophenylester.

Method of synthesis: According to example Ib.

Purification: Gel filtration on Sephadex LH-20 in MeOH.

117 mg (ca 50% of amorphous VIIIa, homogeneous according to TLC in P$_1$ and $[\alpha]_D^{23} = -10.9°$ (c=0.23; DMF), were obtained.

$N^\alpha$ -Cyclohexylcarbonyl—Phe—Val—Arg—pNA . HCL (VIII)

Starting material: 48.02 mg (0.069 mmole) of VIIIa, Method of synthesis: According to example Ig.

Purification: Gel filtration on Sephadex G-15 in 50% AcOH.

33.7 mg (71%) of amorphous, freeze-dried VIII with a chlorine content of 5.11%, homogeneous according to TLC in A and $[\alpha]_D^{23} = -32.8°$ (c=0.68; 50% AcOH), were obtained.

Amino acid analysis: Val: 1.0; Phe: 1.3; Arg: 1.0.

EXAMPLE IX $N^\alpha$ —Tos—Phe—Val—Arg—pNA . HCL (IX)

$N^\alpha$ —Tos—Phe—Val—Arg(NO$_2$) —pNA (IXa)

Starting material: 360 mg (0.5 mmole) of Ic and 180 mg (0.95 mmole) of p-toluenesulphochloride.

Synthetic method: 360 mg of Ic were dissolved in 1 ml of AcOH and 1 ml. 5.6 NHBr/AcOH in a moisture-free atmosphere and were stirred for 1 hour at room temperature. The reaction mixture was then added drop by drop to distilled ether while being vigorously stirred, resulting in the precipitation of 350 mg of 1.5 HBr.H—Phe—Val—Arg (NO$_2$)—pNA. The ether phase was decanted and the precipitate was washed 3 more times with ether. After drying in vacuum over P$_2$O$_5$, the HBr salt of amino acid derivative was obtained in a quantitative yield. The HBr-derivative was dissolved in 4 ml of DMF. The solution was cooled to −10° and 75 mg (0.75mmole) of Et$_3$ N were added in order to liberate H—Phe—Val—Arg (NO$_2$)—pNA from the hydrobromide salt. The reaction time was one hour in a moisture-free atmosphere. The formed Et$_3$N.HBr was filtered off, and the filtrate was cooled to −20°C. 190 mg of p-toluenesulphochloride were added and the solution was allowed to slowly acquire room temperature, after which it was ca 3 hours later, cooled to −10° C and buffered with 25 mg (0.25mmole) of Et$_3$N. The buffering procedure was repeated one more time 2 – 3 hours later. After a ca 24 hours reaction time the solution was evaporated to dryness at 40°C in vacuum. The residue was treated 3 times with distilled water and dried in vacuum. The residue was dissolved in MeOH and purified.

Purification: Gel filtration on Sephadex LH-20 in MeOH.

135 mg (36.5%) of amorphous IXa, homogeneous according to TLC in P$_1$ and $[\alpha]_D^{23} = \pm 0°$ (c=1,0; DMF), were obtained.

$N^\alpha$ —Tos—Phe—Val—Arg—pNA . HCL (IX)

Starting material: 81.43 mg (0.11 mmole) of IXa.

Method of synthesis: According to example Ig.

Purification: Gel filtration on Sephadex G-15 in 20% AcOH.

63 mg (78.4%) of amorphous, freeze-dried IX with a Cl-content of 4.79%, homogeneous according to TLC in A and $[\alpha]_D^{23} = \pm 0$ (c=0.73; 50% AcOH), were obtained.

Amino acid analysis: Val: 1.0; Phe: 1.2; Arg: 1.0.

EXAMPLE X $N^\alpha$ —p — Amino — Bz — Phe — Val — Arg — pNA . 2 HCL (X)

Cbo—p—amino—Bz—Phe—Val—Arg (NO$_2$)—pNA (Xa)

Starting material: 233 mg (0.33 mmole) of Ic and 170 mg (0.44 mmole) of Cbo-p-amino-Bz-OpNP, mp 169–172°.

Method of synthesis: According to example Ib.

Purification: Gel filtration on Sephadex LH-20 in MeOH.

55 mg (20%) of amorphous Xa, homogeneous according to TLC in P$_1$ and $[\alpha]_D^{23} = -30.2°$ (c=0.53; DMF), were obtained.

$N^\alpha$ —p—Amino—Bz—Phe—Val—Arg—pNA . 2 NCL (X)

Starting material: 46.81 mg (0.056 mmole) of Xa.

Method of synthesis: According to example Ig.

Purification: Gel filtration on Sephadex G-15 in 20% AcOH.

15 mg (37%) of amorphous, freeze-dried X with a Cl-content of 9.42%, homogeneous according to TLC in A and $[\alpha]_D^{23} = -46.7°$ (c=0.74; 59% AcOH), were obtained.

Amino acid analysis: Val: 1.0; Phe: 1.0; Arg: 0.95.

EXAMPLE XI

N$^\alpha$ —6—Aminohexanoyl—Phe—Val—Arg—pNA.2 HCl (XI)

Cbo—6—aminohexanoyl—Phe—Val—Arg(NO$_2$)—pNA (XIa)

Starting material: 360 mg (0.5 mmole) of Ic and 290 mg (0.75 mmole) of Cbo-6-aminocapronic acid-p-nitrophenylester.
Method of Synthesis: According to example Ib.
Purification: Gel filtration on Sephadex LH-20 in MeOH.
398 mg (95.5%) of amorphous XIa, homogeneous according to TLC and $[\alpha]_D^{25} = -5.7°$ (c=1.1, DMF), were obtained.

N$^\alpha$ —6—Aminohexanoyl—Phe—Val—Arg—pNA.2 HCl (XI)

Starting material: 300 mg (0.361 mmole) of XIa.
Method of Synthesis: According to example Ig.
Purification: Gel filtration on Sephadex G-15 in 33% AcOH.
127 mg (48%) of amorphous, freeze-dried XI with a chlorine content of 9.68%, homogeneous according to TLC in A and $[\alpha]_D^{23} = -32.0$ (c=0.72; 50% AcOH), were obtained.
Amino acid analysis: Val:1,0, Phe: 1.1, Arg: 1.0

EXAMPLE XII

H—Phe—Leu—Arg—pNA.2 HCl (XII)

Cbo—Leu—Arg(NO$_2$)—pNA (XIIa)

Starting material: 5 g (10.6 mmoles) of Ia and 4.92 g (12.7 mmoles of Cbo—Leu—OpNP.)
Method of Synthesis: According to example Ib.
Purification: Gel filtration on Sephadex LH-20 in MeOH.
6.1 g (98%) of amorphous XIIa, homogeneous according to TLC in P$_1$ and $[\alpha]_D^{25} = -33.5°$ (c=1.0; MeOH), were obtained.

Cbo—Phe—Leu—Arg(NO$_2$)—pNA (XIIb)

Starting material: 3.6 g (6.5 mmoles) of XIIa and 3.27 g (7.8 mmoles) of Cbo—Phe—OpNP.
Method of Synthesis: According to example Ib.
Purification: Gel filtration on Sephadex LH-20 in MeOH.
2.95 (69.9%) of amorphous XIIb, homogeneous according to TLC in P$_1$ and $[\alpha]_D^{25} = -6.2°$ (c=1.0; DMF), were obtained.

H—Phe—Leu—Arg—pNA . 2 HCl (XII)

Starting material: 124.9 mg (0.17 mmoles) of XIIb.
Method of Synthesis: According to example Ig.
Purification: Gel filtration on Sephadex G-25 in 50% AcOH.
65 mg (61%) of amorphous, freze-dried XII with a Cl-content of 11.15%, homogeneous according to TLC in A and $[\alpha]_D^{23} = -24.4°$ (c=0.63; 50% AcOH), were obtained.
Amino acid analysis: Leu: 1.0, Phe: 1.1, Arg: 1.0.

EXAMPLE XIII

N$^\alpha$ —Bz—Phe—Leu—Arg—pNA.HCl (XIII)

N$^\alpha$ —Bz—Phe—Leu—Arg(NO$_2$)—pNA (XIIIa)

Starting material: 734 mg (1 mmole) of XIIb and 272 mg (1.2 mmoles) of Bz$_2$O.
Method of Synthesis: According to example Id.
Purification: Gel filtration on Sephadex LH-20 in MeOH.
589 mg (84%) of XIIIa with mp. 196°–197°C, homogeneous according to TLC P$_1$ and D and $[\alpha]_D^{25} = -19.1°$ (c=1.01; DMF), were obtained.

N$^\alpha$ — Bz—Phe—Leu—Arg—pNA . HCl (XIII)

Starting material: 198.5 mg (0.282 mmole) of XIIIa.
Method of Synthesis: According to example Ig.
Purification: Gel filtration on Sephadex G-25 in 50% AcOH.
188 mg (96%) of amorphous, freeze-dried XIII with a Cl-content of 4.96%, homogenous according to TLC in A and $[\alpha]_D^{24} = -38.3°$ (c=0.69; 50% AcOH), were obtained.
Amino acid analysis: Leu: 1.0, Phe: 1.0, Arg: 1.0.

EXAMPLE XIV:

H—Phe—Ile—Arg—pNA . 2 HCl (XIV)

Cbo—Ile—Arg(NO$_2$)—pNA (XIVa)

Starting material: 1 g (2.1 mmoles) of Ia and 0.98 g (2.46 mmoles) of Cbo-Ile-OpNP.
Method of synthesis: According to example Ib.
Purification: Gel filtration on Sephadex LH-20 in MeOH.
1.12 g (91%) of XIVa with mp 195°–202°C, homogeneous according to TLC in P$_1$ and $[\alpha]_D^{25} = +2.8°$ (c=1.0; DMF), were obtained.

Cho—Phe—Ile—Arg(NO$_2$)—pNA (XIVb)

Starting material: 0.8 g (1.36 mmoles) of XIVa and 0.69 g (1.63 mmoles) of Cbo—Phe—OpNP.
Method of synthesis: According to example Ib.
Purification: Gel filtration on Sephadex LH-20 in MeOH.

445 mg (41%) of XIVb with mp 219°–222°, homogeneous according to TLC in P₁ and $[\alpha]_D^{25} = -7.1°$ (c=1; DMF), were obtained.

H—Phe—Ile—Arg—pNA.HCl  (XIV)

Starting material: 166.43 mg (0.226 mmoles) of XIVb.
Method of synthesis: According to example Ig.
Purification: Gel filtration on Sephadex G-25 in 50% AcOH.
95.3 mg (67%) of amorphous, freezedried XIV with a Cl-content of 11.17%, homogeneous according to TLC in A and $[\alpha]_D^{23} = -32.0°$ (c=0.63; 50% AcOH), were obtained.
Amino acid analysis: Ile: 1.0; Phe: 1.1; Arg: 1.0.

EXAMPLE XV $N^\alpha$—Bz—Phe—Ile—Arg—pNA.HCl  (XV)

$N^\alpha$—Bz—Phe—Ile—Arg(NO₂)—pNA  (XVa)

Starting material: 250 mg (0.34 mmoles) of XIVb and 92 mg (0.4 mmoles) of Bz₂O.
Method of synthesis: According to example Id.
Purification: Gel filtration on Sephadex LH-20 in MeOH.
210 mg (88%) of XVa with mp 244°–245°C, homogeneous according to TLC in P₁ and $[\alpha]_D^{25} = -22.3$ (c=1; DMF), were obtained.

$N^\alpha$—Bz—Phe—Ile—Arg—pNA.HCl  (XV)

Starting material: 182.7 mg (0.26 mmoles) of XVa.
Method of synthesis: According to example Ig.
Purification: Gel filtration on Sephadex G-25 in 50% AcOH.
176.9 mg (97%) of amorphous, freezedried XV, with a Cl-content of 4.98%, homogeneous according to TLC in A and $[\alpha]_D^{24} = -41.5°$ (c=0.69; 50% AcOH), were obtained.
Amino acid analysis; Ile: 1.0; Phe: 1.1; Arg: 1.1.

EXAMPLE XVI

H—Phe—Phe—Arg—pNA.2 HCl  (XVI)

Cbo—Phe—Arg(NO₂)—pNA  (XVIa)

Starting material: 1 g (2.1 mmoles) of Ia and 1.06 g (2.46 mmoles) of Cbo—Phe—OpNP.
Method of synthesis: According to example Ib.
Purification: Gelfiltration on Sephadex LH-20 in MeOH.
1.25 g (96.0%) of XVIa with mp 198°–204°C, homogeneous according to TLC in P₁ and $[\alpha]_D^{25} = +4.2°$ (c=1.0; DMF), were obtained.

Cbo—Phe—Arg(NO₂)—pNA  (XVIb)

Starting material: 0.9 g (1.45 mmoles) of XIVa and 0.737 g (1.74 mmoles) of Cbo—Phe—OpNP.
Method of synthesis: According to example Ib.
Purification: Gel filtration on Sephadex LH-20 in MeOH.
635 mg (58%) of XVIb with mp 201°–203°C, homogeneous according to TLC in P₁ and $[\alpha]_D^{25} = -23.0°$ (c=1.0; DMF), were obtained.

H—Phe—Phe—Arg—pNA . 2 HCl  (XVI)

Starting material: 196.9 mg (0.257 mmoles) of XVIb.
Method of synthesis: According to example Ig.
Purification: Gel filtration on Sephadex G-25 in 50% AcOH.
75.8 mg (46%) of amorphous, freezedried XVI with a Cl-content of 10.65%, homogeneous according to TLC in A and $[\alpha]_D^{23} = -6.7°$ (c=0.65; 50% AcOH), were obtained.
Amino acid analysis: Phe 2.0; Arg: 1.1.

EXAMPLE XVII $N^\alpha$—Bz—Phe—Phe—Arg—pNA . HCl  (XVII)

$N^\alpha$—Bz—Phe—Phe—Arg(NO₂)—pNA  (XVIIa)

Starting material: 250 mg (0.325 mmole) of XVIb and 90 mg (0.312 mmole) of Bz₂O.
Method of synthesis: According to example Id.
Purification: Gel filtration on Sephadex LH-20 in MeOH.
220 mg (92%) of amorphous XVIIa, homogeneous according to TLC in P₁ and $[\alpha]_D^{25} = -36.6°$ (c=0.95; DMF), were obtained.

$N^\alpha$—BZ—Phe—Phe—Arg—pNA.HCl  (XVII)

Starting material: 114.6 mg (0.156 mmole) of XVIIa.
Method of synthesis: according to example Ig.
Purification: Gel filtration on Sephadex G-25 in 50% AcOH.
77.4 mg (68%) of amorphous, freezedried XVII with a Cl-content of 4.81%, homogeneous according to TLC in A and $[\alpha]_D^{24} = -25.5°$ (c=0.72; 50% AcOH), were obtained.
Amino acid analysis: Phe: 2.0; Arg: 0.97.

EXAMPLE XVIII

H—D—Phe—Val—Arg—pNA.2 HCl  (XVIII)

Cbo—D—Phe—Val—Arg(NO₂)—pNA  (XVIIIa)

Starting material: 480 mg (0.83 mmole) of Ib and 530 mg (1.25 mmole) of Cbo—D—Phe—OpNP with mp 126.2° – 126.6°, $[\alpha]_D^{24} = +24.75°$ (c=1.0; DMF).

Method of synthesis: According to example Ib.

Purification: Gel filtration on Sephadex LH-20 in MeOH.

587 mg (98%) of amorphous XVIIIa, homogeneous according to TLC in $P_1$ and $[\alpha]_D^{23} = +18.9°$ (c=2.0; DMF), were obtained.

H—D—Phe—Val—Arg—pNA.2 HCl (XVIII)

Starting material: 153.8 mg (0.212 mmole) of XVIIIa.

Method of synthesis: According to example I.

Purification: Gel filtration on Sephadex G-15 in 20% AcOH.

36.3 mg (28%) of amorphous, freezedried XVIII with a Cl-content of 11.34%, homogeneous according to TLC in A and $[\alpha]_D^{23} = -70.3°$ (c=0.61; 50% AcOH), were obtained.

Amino acid analysis: Val: 1.0; Phe: 1.1; Arg: 1.0.

EXAMPLE XIX $N^\alpha$ —Bz—D—Phe—Val—Arg—pNA.HCl (XIX)

$N^\alpha$ —Bz—D—Phe—Val—Arg($NO_2$)—pNA (XIXa)

Starting material: 244 mg (0.34 mmole) of XVIIIa and 92 mg (0.41 mmole) of $Bz_2O$.

Method of synthesis: According to example Id.

Purification: Gel filtration on Sephadex LH-20 in MeOH.

181 mg (77%) of XIX with mp 211°–215°C, homogeneous according to TLC in $P_1$, and $[\alpha]_D^{23} = -1.36°$ (c=0.8; DMF), were obtained.

$N^\alpha$ —Bz—D—Phe—Val—Arg—pNA.HCl (XIX)

Starting material: 128.3 mg (0.186 mmole) of XIXa.

Method of synthesis: According to example Ig.

Purification: Gel filtration on Sephadex G-25 in 5% AcOH.

103.8 mg (81%) of amorphous, freezedried XIX with a Cl-content of 5.15%, homogeneous according to TLC in A and $[\alpha]_D^{23} = -36.9°$ (c=0.68; 50% AcOH), were obtained.

Amino acid analysis: Val: 1.0; Phe: 0.9; Arg: 0.9.

EXAMPLE XX:

H—Tyr—Val—Arg—pNA.HCl (XX)

Cbo—Tyr—(OBz)—Val—Arg($NO_2$)—pNA (XXa)

Starting material: 480 mg (0.83 mmole) of and 660 mg (1.25 mmoles) of Cho—Tyr (OBz)—OpNP with mp 147.5°–149.0° and $[\alpha]_C^{25} = -8.5°$ (c=2.0,: DMF).

Method of synthesis: According to example Ib.

Purification: Gel filtration on Sephadex LH-20 in MeOH.

460 mg (65%) of amorphous XXa, homogeneous according to TLC in $P_1$ and $[\alpha]_D^{23} = -9.66°$ (c=1.0; DMF), were obtained.

H—Tyr—Val—Arg—pNA.HCl (XX)

Starting material: 144.7 mg (0.169 mmoles) of XXa.

Method of synthesis: According to example Ig.

Purification: Gel filtration on Sephadex G-15 in 20% AcOH.

65.4 mg (62%) of amorphous, freezedried XX with a Cl-content of 11:20%, homogeneous according to TLC in A and $[\alpha]_D^{23} = -29.8°$ (c=0.63; 50% AcOH), were obtained.

Amino acid analysis: Val: 1.0,: Tyr: 1.2; Arg: 1.0.

EXAMPLE XXI $N^\alpha$ —Bz—Tyr—Val—Arg—pNA · HCl (XXI)

$N^\alpha$ —Bz—Tyr—Val—Arg($NO_2$)—pNA (XXIa)

Starting material: 246 mg (0.287 mmole) of XXa and 65 mg (0.29 mmole) of $Bz_2O$.

Method of synthesis: According to example Id.

The Bz-group, which protects tyrosin-OH is to some degree split off during the treatment with HBr. The yield is therefore low, and consists apparently of both XXIa and $N^\alpha$ —Bz—Tyr (OBz)—Val—Arg($NO_2$)—pNA.

Purification: Gel filtration on Sephadex LH-20 in MeOH.

193 mg (81%) of an amorphous product, which shows 2 substances according to TLC in $P_1$ (see above).

$N^\alpha$ —Bz—Tyr—Val—Arg—pNA · HCl (XXI)

Starting material: 138.9 mg of XXIa and N —Bz—Tyr(OBz)—Val—ARg($NO_2$)—pNA.

Method of synthesis: According to example Ig.

Purification: Gel filtration on Sephadex G-15 in 50% AcOH.

75.4 mg of amorphous, freezedried XXI with a Cl-content of 5.3%, homogeneous according to TLC in A, $[\alpha]_D^{23} = -34.7°$ (c=0.7; 50% AcOH), were obtained.

Amino acid analysis: Val: 1.0; Tyr: 1.2; Arg: 1.0.

EXAMPLE XXII $N^\alpha$ —4—Aminoethylcyclohexylcarbonyl—Phe—Val—Arg—pNA · 2 HCl (XXII)

Cbo—4—aminoethylcyclohexylcarbonyl—Phe—Val—ARg—pNA (XXIIa)

Starting material: 268 mg (0.65 mmole) of Cbo—4—aminoethylcyclohexylcarbonyl—OpNP and 360 mg (0.5 mmole) of Ic.

Method of synthesis: According to example Ib.

Purification: Gel filtration on Sephadex LH-20 in MeOH.

265 mg (62%) of amorphous XXIIa, homogeneous according to TLC in $P_1$ and $[\alpha]_D^{23} = -8.5°$ (c=0.51; DMF), were obtained.

$N^\alpha$ —4—Aminoethylcyclohexylcarbonyl—Phe—Val—Arg—pNA · 2 HCl (XXII)

Starting material: 137 mg (0.16 mmole) of XXIa.
Method of synthesis: According to example Ig.
Purification: Gel filtration on Sephadex G-15 in 33% AcOH.

82.2 (68.5%) of amorphous, freezedried XXII with a Cl-content of 9.37%, homogeneous according to TLC in A and $[\alpha]_D^{25} = -35.2°$ (c=0.73; 50% AcOH), were obtained.

Amino acid analysis: Val: 1.0; Phe: 1.1; Arg: 1.0.

EXAMPLE XXIII $N^\alpha$ —2—Cyclohexylacetyl—Phe—Val—Arg—pNA · HCl (XXIII)

$N^\alpha$ —2—Cyclohexylacetyl—Phe—Val—Arg(NO$_2$)—pNA (XXIIIa)

Starting material: 197 mg (0.75 mmole) of Cyclohexylacetyl - OpNP and 331 mg (0.46 mmole) of Ic.
Method of synthesis: According to example Ib.
Purification: Gel filtration on Sephadex LH-20 in MeOH.

205 mg (63%) of amorphous XXIIIa, homogeneous according to TLC in $P_1$ and $[\alpha]_D^{23} = -5.0°$ (c=0.5; DMF) were obtained.

$N^\alpha$ —2—Cyclohexylacetyl—Phe—Val—Arg—pNA · HCl (XXIII)

Starting material: 173 mg (0.244 mmole) of XXIIIa.
Method of synthesis: According to example Ig.
Purification: Gel filtration on Sephadex G-15 in 33% AcOH.

139 mg (81%) of amorphous freezedried XXIII with a Cl-content of 5.01%, homogeneous according to TLC in A and $[\alpha]_D^{23} = -32.0°$ (c = 0.35; 50% AcOH), were obtained.

Amino acid analysis: Val: 1.0; Phe: 1.1; Arg: 1.0.

EXAMPLE XXIV

4—Aminobutyryl—Phe—Val—Arg—pNA · 2 HCl (XXIV)

Cbo—4—aminobutyryl—Phe—Val—Arg(NO$_2$)—pNA (XXIVa)

Starting material: 234 mg (0.65 mmole) of Cbo-4-amino-butyryl-OpNP and 360 mg of (0.5 mmole) Ic.
Method of synthesis: According to example Ib.
Purification: Gel filtration on Sephadex LH-20 in MeOH.

297 mg (74%) of amorphous XXIVa, homogeneous according to TLC in $P_1$ and $[\alpha]_D^{23} = -5.0°$ (c=0.6; DMF), were obtained.

4—Aminobutyryl—Phe—Val—Arg—pNA · 2 HCl (XXIV)

Starting material: 291 mg (0.362 mole) of XXIVa.
Method of synthesis: According to example Ig.
Purification: Gel filtration on Sephadex G-15 in 33% AcOH.

167 mg (66%) of amorphous, freezedried XXIV with a Cl-content of 10.05%, homogeneous according to TLC in A and $[\alpha]_D^{23} = -35.3°$ (c=0.72; 50% AcOH), were obtained.

Amino acid analysis: Val: 1.0; Phe: 1.0; Arg: 1.1.

EXAMPLE XXV

2—(4—Aminophenyl)—acetyl—Phe—Val—Arg—pNA · 2 HCl (XXV)

2—(4—Cbo—aminophenyl)—acetyl—Phe—Val—Arg(NO$_2$)—pNA (XXVa)

Starting material: 200 mg (0.278 mmole) of Ic and 152 mg (0.371 mmole) of 2—(4—Aminophenyl)—acetyl—OpNP.
Method of synthesis: According to example Ib.
Purification: Gel filtration on Sephadex LH-20 in MeOH.

201 mg (85%) of amorphous XXVa, homogeneous according to TLC in $P_1$ and $[\alpha]_D^{24} = -4.3°$ (c=0.5; DMF), were obtained.

2—(4-Aminophenyl)—acetyl—Phe—Val—Arg—pNA · 2 HCl (XXV)

Starting material: 97.5 mg (0.114 mmole) of XXVa.
Method of synthesis: According to example Ig.
Purification: Gel filtration on Sephadex G-15 in 33% AcOH.

43.5 mg (51%) of amorphous freezedried XXV with a Cl-content of 9.47%, homogeneous according to TLC in A and $[\alpha]_D^{23} = -33.0°$ (c=0.75; 50% AcOH), were obtained.

Amino acid analysis: Val: 1.0; Phe: 1.1; Arg: 1.1.

EXAMPLE XXVI $N^\alpha$ —Bz—C—Phi—Gly—Val—Arg—pNA · HCl (XXVI)

Cbo—C—Ph · Gly—Val—Arg(NO$_2$)—pNA (XXVIa)

Starting material: 230 mg (0.568 mmole) of Cbo—C—Ph · Gly—OpNP and 250 mg (0.437 mmole) of Ib.
Method of synthesis: According to example Ic.
Purification: Gel filtration on Sephadex LH-20 in MeOH.

292 mg (95%) of amorphous XXVIa, homogeneous according to TLC in $P_1$ and $[\alpha]_D^{24} = +8.2°$ (c=0.50; DMF), were obtained.

$N^\alpha$ —Bz—Ph · Gly—Val—Arg (NO$_2$)—pNA (XXVIb)

Starting material: 290 mg (0.41 mmole) of XXVIa and 130 mg (0.575 mmole) of Bz$_2$O.
Method of synthesis: According to example Id.
Purification: Gel filtration on Sephadex LH-20 in MeOH.
211 mg (76%) of amorphous XXVIb, homogeneous according to TLC in P$_1$ and $[\alpha]_D^{23} = +10.4°$ (c=0.51; DMF), were obtained.

N$^\alpha$ —Bz—C—Ph · Gly—Val—Arg—pNA · HCl (XXVI)

Starting material: 200 mg (0.296 mmole) of XXVIb.
Method of synthesis: According to example Ig.
Purification: Gel filtration on Sephadex G-15 in 33% AcOH.
186 mg (95%) of amorphous freezedried XXVI with a Cl-content of 5.25%, homogeneous according to TLC in A and $[\alpha]_D^{25} = -27.0°$ (c=0.67; 50% AcOH), were obtained.
Amino acid analysis: Val: 1.0; C—PH · Gly: 1.2; Arg: 0.9.

EXAMPLE XXVII

N$^\alpha$ —Bz—Phe—Phe—Val—Arg—pNA · HCl (XXVII)

N$^\alpha$ —Bz—Phe—Phe—Val—Arg(NO$_2$)—pNA (XXVIIa)

Starting material: 141 mg (0.163 mmole) of IVa and 90 mg (0.4 mmole) of Bz$_2$O.
Method of synthesis: According to example Id.
Purification: Gel filtration on Sephadex LH-20 in MeOH.
114 mg (84%) of amorphous XXVIIa, homogeneous according to TLC in P$_1$ and $[\alpha]_D^{24} = -0.75°$ (c=1.2; DMF), were obtained.

N$^\alpha$ —Bz—Phe—Phe—Val—Arg—pNA · HCl (XXVII)

Starting material: 71 mg (ca 0.087 mmole) of XXVIIa.
Method of synthesis: According to example Ig.
Purification: Gel filtration on Sephadex G-15 in 33% AcOH.
47 mg (60%) of amorphous freezedried XXVII with a Cl-content of 4.23%, homogeneous according to TLC in A, were obtained.
Amino acid analysis: Val: 1.0; Phe: 2.3; Arg: 1.0.

EXAMPLE XXVIII

N$^\alpha$ —Bz—DL—C—Ph · Gly—Val—Arg—pNA · HCl (XXVIII)

Cbo—Dl—C—Ph · Gly—Val—Arg(NO$_2$)—pNA (XXVIIIa)

Starting material: 285 mg (0.5 mmole) of Ib and 285 mg (0.7 mmole) of Cbo—DL—C—Ph · Gly—OpNP with mp 107–108°C.
Method of synthesis: According to example Ic.
Purification: Gel filtration on Sephadex LH-20 in MeOH.
353 mg (81%) of amorphous XXVIIIa, homogeneous according to TLC in P$_1$, were obtained.

N$^\alpha$ —Bz—DL—C—Ph · Gly—Val—Arg(NO$_2$) · pNA (XXVIIIb)

Starting material: 285 mg (0.403 mmole) of XXVIIIa and 181 mg (0.8 mmole) of Bz$_2$O.
Method of snythesis: According to example Id.
Purification: Gel filtration on Sephadex LH-20 in MeOH.
226 mg (83%) of amorphous XXVIIIb, homogeneous according to TLC in P$_1$, were obtained.

N$^\alpha$ —Bz—DL—C—Ph · Gly—Val—Arg—pNA · HCl (XXVIII)

Starting material: 101 mg (0.15 mmole) of XXVIIIb.
Method of synthesis: According to example Ig.
Purification: Gel filtration on Sephadex G-15 in 33% AcOH.
61 mg (61%) of amorphous, freezedried XXVIII with a Cl-content of 5.21%, homogeneous according to TLC in A, were obtained.
Amino acid analysis: Val: 1.0; C—Ph · Gly: 1.2; Arg: 0.9.

EXAMPLE XXIX

N$^\alpha$ —Bz—Phe—Val—Arg—2—NA · HCl (XXIX)

Cbo—Arg(NO$_2$)—2—NA (XXIXa)

Starting material: 3.6 g (10 mmoles) of Cbo—Arg(NO$_2$)—OH and 1.72 g (12 mmoles) of 2-naphtylamine
Method of synthesis: According to example Ia-2.
Purification: Gel filtration on Sephadex LH-20 in MeOH.
4.05 g (84%) of amorphous XXIXa, homogeneous according to TLC in P$_1$ and $[\alpha]_D^{23} = +7.4°$ (c=1.0; DMF), were obtained.

Cbo—Val—Arg(NO$_2$)—2—NA (XXIXb)

Starting material: 1.5 g (3.1 mmoles) of XXIXa and 1.38 g (3.7 mmoles) of Cbo—Val—OpNP.
Method of synthesis: According to example Ib.
Purification: Gel filtration on Sephadex LH-20 in MeOH.
1.66 g (95%) of partially crystalline XXIXb, homogeneous according to TLC in P$_1$ and $[\alpha]_D^{22} = -6.0°$ (c=1.01; DMF), were obtained.

Cbo—Phe—Val—Arg(NO$_2$)—2—NA (XXIXc)

Starting material: 1.65 g (2.84 mmoles) of XXIXb and 1.43 g (3.4 mmoles) of Cbo—Phe—OpNP.
Method of synthesis: According to example Ic.
Purification: Gel filtration on Sephadex LH-20 in MeOH.
1.55 g (75%) of amorphous XXIXc, homogeneous according to TLC in P$_1$ and $[\alpha]_D^{22} = -10.9°$ (c=1.01; DMF), were obtained.

N$^\alpha$ —Bz—Phe—Val—Arg(NO$_2$)—2—NA (XXIXd)

Starting material: 1.15 g (1.58 mmoles) of XXIXc and 465 mg (2.05 mmoles) of Bz$_2$O.
Method of synthesis: According to example Id.
Purification: Gel filtration on Sephadex LH-20 in MeOH.
0.89 g (80.3%) of partially crystalline XXIXd, homogeneous according to TLC in P$_1$ and $[\alpha]_D^{20} = -31.1°$ (c=1.01; DMF), were obtained.

N$^\alpha$ —Bz—Phe—Val—Arg—2—NA · HCl (XXIX)

Starting material: 620 mg (0.89 mmole) of XXIXd.
Method of synthesis: According to example Ig.
Purification: Gel filtration on Sephadex G-15 in 50% AcOH.
385 mg (63%) of amorphous, freezedried XXIX with a Cl-content of 5.12%, homogeneous according to TLC in A and $[\alpha]_D^{22} = -53.8°$ (c=0.71; 50% AcOH), were obtained.
Amino acid analysis: Val: 1.0; Phe: 1.1; Arg: 1.0.

EXAMPLE XXX

N$^\alpha$ —Bz—Phe—Val—Arg—1—nitro—2—NA · HCl (XXX)

Cbo—Arg(NO$_2$)—1—nitro—2—NA (XXXa)

Starting material: 3.6 g (10 mmoles) of Cbo—Arg(NO$_2$)—OH and 2.26 g (12 mmoles) of 1-nitro-2-naphthylamine.
Method of synthesis: According to example Ia-2.
Purification: Gel filtration on Sephadex LH-20 in MeOH.
3.85 g (73.1%) of amorphous XXXa, homogeneous according to TLC in P$_1$ and $[\alpha]_D^{19} = -11.8°$ (c=1.0; DMF), were obtained.

Cbo—Val—Arg(NO$_2$)—1—nitro—2—NA (XXXb)

Starting material: 950 mg (1.8 mmoles) of XXXa and 825 mg (2.2 mmoles) of Cbo—Val—OpNP.
Method of synthesis: According to example Ib.
Purification: Gel filtration on Sephadex LH-20 in MeOH.
0.9 g (80%) of partially crystalline XXXb, homogeneous according to TLC in P$_1$ and $[\alpha]_D^{22} = +1.05°$ (c=1.0; DMF), were obtained.

Cbo—Phe—Val—Arg(NO$_2$)—1—nitro—2—NA (XXXc)

Starting material: 800 mg (1.27 mmoles) of XXXb and 640 mg (1.52 mmoles) of Cbo—Phe—OpNP.
Method of synthesis: According to example Ic.
Purification: Gel filtration on Sephadex LH-20 in MeOH.
785 mg (79.9%) of amorphous XXXc, homogeneous according to TLC in P$_1$ and $[\alpha]_D^{22} = -7.0°$ (c=1.02; DMF), were obtained.

N$^\alpha$ —Bz—Phe—Val—Arg (NO$_2$)—1—nitro—2—NA (XXXd)

Starting material: 680 mg (0.88 mmoles) of XXXb and 260 mg (1.15 mmoles) of Bz$_2$O.
Method of synthesis: According to example Id.
Purification: Gel filtration on Sephadex LH-20 in MeOH.
480 mg (73%) of amorphous XXXd, homogeneous according to TLC in P$_1$ and $[\alpha]_D^{24} = -31.4°$ (c= 0.9; DMF), were obtained.

N$^\alpha$ —Bz—Phe—Val—Arg—1—nitro—2—NA · HCl (XXX)

Starting material: 480 mg (0.65 mmoles) of XXXd.
Method of synthesis: According to example Ig.
Purification: Gel filtration on Sephadex G-15 in 33% AcOH.
268 mg (57%) of amorphous, freezedried XXX with a Cl-content of 4.80%, homogeneous according to TLC in A and $[\alpha]_D^{22} = -39.7°$ (c=0.73; 50% AcOH), were obtained.

EXAMPLE XXXI

N$^\alpha$ —Bz—Phe—Val—Arg—4—nitro—1—NA · HCl (XXXI)

Cbo—Arg(NO$_2$)—4—nitro—1—NA (XXXIa)

Starting material: 3.6 g (10 mmoles) of Cbo—Arg(NO$_2$)—OH and 2.26 g (12 mmoles) of 4-nitro-1-naphthylamine.
Method of synthesis: According to example Ia-2.
Purification: Gel filtration on Sephadex LH-20 in MeOH.
3.61 g (60%) of partially crystalline XXXa, homogeneous according to TLC in P$_1$ and $[\alpha]_D^{22} = -11.4°$ (c=1.01; DMF, were obtained.

Cbo—Val—Arg(NO$_2$)—4—nitro—1—NA (XXXIb)

Starting material: 650 mg (1.23 mmoles) of XXXIa and 550 mg (1.45 mmoles) Cbo—Val—OpNP.
Method of synthesis: According to example Ib.
Purification: Gel filtration on Sephadex LH-20 in MeOH,
460 mg (60%) of amorphous XXXIb, homogeneous according to TLC in P$_1$ and $[\alpha]_D^{23} = +0.9°$ (c=0.55; DMF), were obtained.

Cbo—Phe—Val—Arg(NO$_2$)—4—nitro—1—NA (XXXIc)

Starting material: 450 mg (0.72 mmoles) of XXXIb and 365 mg (0.86 mmoles) of Cbo—Phe—OpNP.
Method of synthesis: According to example Ic.
Purification: Gel filtration on Sephadex LH-20 in MeOH.
500 mg (90%) of partially crystalline XXXIc, homogeneous according to TLC in P$_1$ and $[\alpha]_D^{24} = -6.0°$ (c=1.0; DMF), were obtained.

N$^\alpha$ —Bz—Phe—Val—Arg(NO$_2$)—4—nitro—1—NA (XXXId)

Starting material: 490 mg (0.633 mmole) of XXXIc and 180 mg (0.80 mmole) of $Bz_2O$.
Method of synthesis: According to example Id.
Purification: Gel filtration on Sephadex LH-20 in MeOH.
400 mg (84.7%) of amorphous XXXId, homogeneous according to TLC in $P_1$ and $[\alpha]_D^{20} = -31.0°$ (c=1.0; DMF), were obtained.

$N^\alpha$ —Bz—Phe—Val—Arg—4—nitro—1—NA · HCl (XXXI)

Starting material: 380 mg (0.51 mmole) of XXXId.
Method of synthesis: According to example Ig.
Purification: Gel filtration on Sephadex G-15 in 50% AcOH.
303 mg (81%) of amorphous, freezedried XXXI with a Cl-content of 4.79%, homogeneous according to TLC in A and $[\alpha]_D^{22} = -37.7°$ (c=0.74; 50% AcOH), were obtained.
Amino acid analysis: Val: 1.0; Phe: 1.1; Arg: 0.9.

EXAMPLE XXXII:

$N^\alpha$ —Bz—Phe—Val—Lys—pNA · HCl (XXXII)

$N^\alpha$ —BOC—Lys($\epsilon$—Cbo)—pNA (XXXIIa)

6.3 g (11.2 mmoles) of $N^\alpha$ —BOC—Lys ($\epsilon$ Cbo-)—OH. DCHA were dissolved in 40 ml of dry, newly distilled HMPTA at room temperature, after which 5 g (30.5 mmoles) of p-nitrophenylis-ocyanate were added in portions while stirring and in an atmosphere free from moisture. After 24 hours at room temperature the reaction mixture was treated in accordance with the description in example Ia. Byproducts of the reaction were N, N'-bis-p-nitro-phenylcarbamide and N-p-nitrophenyl-N,N'-dicyclohexylcarbamide, which were scarcely soluble in MeOH was purified by means of gel-filtration on a column with Sephadex LH-20 equilibrated with MeOH. 4.17 g (74.5%) of partially crystalline XXXIIa, homogeneous according to TLC in $P_1$ and $[\alpha]_D^{21} = +1.7°$ (c=1.0; DMF, were obtained.

$N^\alpha$ —BOC—Val—Lys ($\epsilon$—Cbo)—pNA (XXXIIb)

10 ml of newly distilled trifluoroacetic acid were added to 2.20 g (4.4 mmoles) of XXXIIa in an atmosphere free from moisture. After stirring for 60 min. at room temperature the reaction solution was poured into 150 ml of dry ether while stirring vigorously; this resulted in the precipitation of $CF_3COOH$ · H—Lys(-$\epsilon$—Cbo)—pNA as an oil that hardened with cooling. The ether phase eas decanted and the precipitate was treated a further 3 times with 75 ml of dry ether. After drying in vacuum over NaOH and $P_2O_5$, the trifluoroacetate salt of the lysin derivate eas obtained in a quantitative yield (2.24 g).

2.25 g(4.4 mmoles) of $CF_3COOH$ · H—Lys($\epsilon$—Cbo)—pNA were dissolved in 10 ml of DMF and cooled to —10°C. 0.75 ml (5.5 mmoles) of $Et_3N$ were added in order to liberate the amino acid derivative from its trifluoroacetate salt and thereafter 2.0 g (5.5 mmoles) of BOC—Val—OpNP. When, after several hours, the reaction solution had acquired room temperature, it was cooled again and buffered with 0.31 ml (2.2 mmoles) of $Et_3N$. The buffering procedure was repeated one more time after ca 2 hours. After a 24 hour reaction time, the solution was evaporated until dryness, in vacuum at ca 40°C. The residue was treated 3 times with 20 ml of distillea water, and dried in vacuum.

The crude product was dissolved in MeOH and purified by means of gel filtration on a column with Sephadex LH-20 equilibrated with MeOH. A fraction obtained from the eluate yielded 2.12 g (80.3%) of XXXIIb which was homogeneous according to TLC in $P_1$ and C, and with $[\alpha]_D^{22} = -1.9°$ (c=1.0; DMF).

BOC—Phe—Val—Lys($\epsilon$—Cbo)—pNA (XXXIIc)

Starting material: 0.85 g (1.42 mmoles) of XXXIIb and 0.77 g (2.0 mmoles) of BOC—Phe—OpNP.
Method of synthesis: According to example XXXIIb.
Purification: Gel filtration on Sephadex LH-20 in MeOH.
0.84 g (79.3%) of amorphous XXXIIc, homogeneous according to TLC in $P_1$ and $[\alpha]_D^{23} = -9.3°$ (c=1.02; DMF), were obtained.

$N^\alpha$ —Bz—Phe—Val—Lys ($\epsilon$—Cbo)—pNA (XXXIId)

Starting material: 600 mg (0.804 mmole) of XXXIIc and 280 mg (1.25 mmoles) of $Bz_2O$.
Method of synthesis: Decarbobutyloxylation of XXXIIc was carried out analgously to the method of example XXXIIb.
608 mg of $CF_3COOH$ . H—Phe—Val—Lys($\epsilon$—Cbo)—pNA were dissolved in 10 ml of DMF and cooled to —10°, after which 113 ml (0.8 mmole) of $Et_3N$ were added in order to liberate the peptide amine form its salt. 280 mg (1.25 mmoles) of $Bz_2O$ were added to the solution at a temperature of —10°C, after which it was buffered and treated in accordance with example XXXIIb. The gel filtration of the crude product on a column with Sephadex LH-20 in MeOH yielded 460 mg according to TLC in $P_1$ and C and with $[\alpha]_D^{24} = -22.8°$ (c=0.99; DMF).

$N^\alpha$ —Bz—Phe—Val—Lys—pNA · HCl (XXXII)

Starting material: 280 mg (0.373 mmole) of XXXIId.
Method of synthesis: According to example Ig.
Purification: Gel filtration on Sephadex G-15 in 50% AcOH.
172 g (71%) of amorphous, freezedried XXXII with a Cl-content of 5.39%, homogeneous according to TLC in A and $[\alpha]_D^{22} = -36.2°$ (c=0.67; 50% AcOH), were obtained.
Amino acid analysis: Val: 1.0; Phe: 0.9; Lys 1.1.

The substrates produced according to the examples were used for determination of different enzymes according to the following:

The principle for the determination is based upon the fact that the product formed by the enzymatic hydrolysis shows an UV spectrum which is entirely separate from that of the substrate. Thus, the substrate according to example 1 $N^\alpha$—Bz—Phe—Val—Arg—p-NA.HCl has an absorption maximum at 303 nm with the molar extinction coefficient 12,900. The absorption of the substrate is insignificant at 405 nm. p-Nitroaniline (pNA), which is formed from the substrate during the enzymatic hydrolysis, has an absorption maximum at 380 nm with a molar extinction coefficient of 13,200, which at 405 nm has only been reduced to 9,620.

Therefore, by means of measuring spectrophotometrically at 405 nm, one can readily follow the degree of the enzymatic hydrolysis which is proportional to the amount of p-nitro aniline formed. The excess of substrate which is present does not interfere with the measurement at that wave-length The circumstances are almost identical for the remaining substrates of the invention, and for this reason the spectrophotometric measurements were throughout made at 405 nm.

The enzymatic reaction can schematically be written in the following manner:

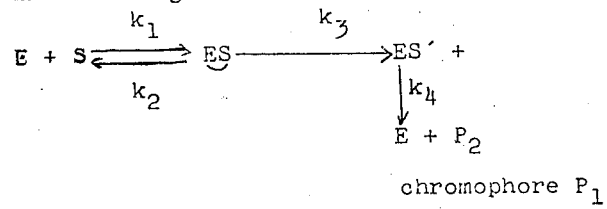

$$chromophore\ P_1$$

E = enzyme
S = substrate
ES = enzyme-substrate complex
$P_1$ and $P_2$ = products
$k_1, k_2, k_3$ and $k_4$ = rate constants
Dissociation const. for $ES = k_2/k_1 = K_m$ (Michaelis const.)

If $(S) \gg (E)$ and $k_4 \ll k_3$ the following is true:

$$K_m = [(E) - (ES)] \times (S)/(ES) \quad (1)$$

The rate at which the chromophore $P_1$ is formed: $v = k_3 \times (ES)$ $$v = k_3 \times (E) \times (S)/K_m + (S) \quad (2)$$

When all $E$ is bound to $S$, $(ES) = (E)$ and $$v = v_{max} = k_3 \times (E) \quad (3)$$

Lineweaver-Burk equation:

$$(1/v) = (K_m/v_{max}) \times [1/(S)] + (1/v_{max}); \quad (4)$$

As evident from equation (2), the constants $K_m$ and $k_3$ determine the efficiency of the enzyme substrate for a given enzyme. For the purpose of determining these constants, the procedure is in principle the following: The enzyme and the substrate are mixed in a buffer solution and the reaction is followed spectrophotometrically for 5 min. The concentration of the substrate $(S)$ is varied, while the enzyme concentration $(E)$ for each substrate is kept constant. The extinction $(OD)$ is plotted as a function of time. From the curve obtained in this manner the tangent (= difference in extinction per min, $\Delta\ OD$/min, from which the amount $\mu$mol formed p-NA/min $(v)$, may be calculated) at time zero gives the initial reaction rate, $v$. If $1/v$ is plotted against $1/(S)$ $K_m$ and $v_{max}$ (of equation (4) are obtained from the diagram. $K_m$ and $k_3$ $(= v_{max}/(E))$ for thrombin and different enzyme substrates are given in Table 1 and for trypsin in Table 2. The data regarding $K_m$ and $k_3$ is missing in those cases where the values have not been determined, or where they could not be calculated because no linear relation between $1/v$ and $1/(S)$ was obtained.

A rough evaluation of the enzyme-substrate relationship for different substrates may be obtained by means of comparing the amount of p-nitroaniline formed per min. and per ml at the same concentration of the substrates. This is shown in Table 3 for thrombin, in Table 4 for trypsin, in Table 5 for the enzyme Reptilase which is an enzyme recovered from Bothrops Atrox and related in action to thrombin, and in Table 6 for plasmin.

Optimum conditions for amidolysis of the substrate according to ex. I, with thrombin are obtained at a pH of 8.2 with an ion strength of 0.13 - 0.15 and at a temperature of 37°-40°C.

The letters NIH used in the tables refer to units of the National Institute of Health. The trypsin unit is equal to the hydrolysis of one $\mu$mol of $N^\alpha$-tosyl-arginine-methyl ester hydrochloride (TAME) per minute at 25°C and pH 8.1 in the presence of 0.01 M calcium ion, and the trypsin was obtained from Worthington Biochemical Corporation, Freehold, N.J., USA. The plasmin was obtained from AB Kabi, Stockholm, Sweden, and 1 mg was equal to 3 casein units (CU).

Table 1

Thrombin activity, $K_m$ and $k_3$

| Substrate | Substrate conc. ($\mu$mol/l) | Enzyme conc. (NIH/ml) | $K_m \times 10^4$ (mol/l) | $k_3 \times 10^4$ ($\mu$mol/min, NIH/ml) |
|---|---|---|---|---|
| BAPNA | 250–666 | 50 | 6 | 11 |
| I | 19.3–89.6 | 0.5 | 1.62 | 1340 |
| II | 28.2–94.0 | 5 | 0.8 | 50 |
| VIII | 19.3–89.6 | 0.5 | 0.55 | 360 |
| XII | 31.8–106.0 | 5 | 3.91 | 110 |

Table 3

Thrombin activity

| Substrate | Substrate conc. nmoles per ml | Enzyme conc. NIH-units per ml | Formed p-nitroaniline nmoles per min. and per ml |
|---|---|---|---|
| BAPNA | 333.0 | 50.0 | 1.04 |
| I | 64.6 | 0.417 | 6.0 |
| VI | 67.4 | do. | 0.3 |
| VIII | 65.4 | do. | 2.7 |
| IX | 66.4 | do. | 0.5 |
| X | 58.2 | do. | 1.7 |
| XI | 65.1 | do. | 0.2 |
| XVIII | 66.9 | do. | 5.6 |
| XIX | 66.2 | do. | 0.3 |
| XX | 67.6 | do. | 0.2 |
| XXI | 65.6 | do. | 1.7 |
| XXII | 65.7 | do. | 2.0 |
| XXIV | 66.6 | do. | 0.4 |
| XXV | 66.4 | do. | 0.6 |
| XXVI | 64.7 | do. | 1.4 |
| XXXII | 69.0 | do. | 0.1 |

Table 4

Trypsin activity

| substrate | Substrate conc. nmoles per ml | Enzyme conc. units per ml | Formed p-nitroaniline nmoles per min and per ml |
| --- | --- | --- | --- |
| BAPNA | 333.0 | 2.08 | 6.1 |
| I | 66.7 | 0.0833 | 16.3 |
| V | 66.2 | do. | 12.9 |
| VI | 67.4 | do. | 11.1 |
| VIII | 65.4 | do. | 13.7 |
| IX | 66.4 | do. | 6.8 |
| X | 58.2 | do. | 13.1 |
| XI | 65.1 | do. | 1.6 |
| XVIII | 66.9 | do. | 14.1 |
| XIX | 66.2 | do. | 5.5 |
| XX | 67.6 | do. | 6.2 |
| XXI | 65.6 | do. | 14.0 |
| XXII | 65.7 | do. | 6.2 |
| XXIII | 67.1 | do. | 5.9 |
| XXIV | 66.6 | do. | 6.2 |
| XXV | 66.4 | do. | 10.9 |
| XXVI | 64.7 | do. | 23.7 |
| XXXII | 69.0 | do. | 2.9 |

Table 5

Reptilase activity

| Substrate | Substrate conc. nmoles per ml | Enzyme conc. units per ml | Formed p-nitroaniline nmoles per min and per ml |
| --- | --- | --- | --- |
| I | 66.7 | 0.5 | 4.4 |
| II | 66.7 | do. | 3.0 |
| XIII | 66.7 | do. | 4.6 |
| XV | 66.7 | do. | 2.2 |

Table 6

Plasmin activity

| Substrate | Substrate conc. nmoles per ml | Enzyme conc. CU-units per ml | Formed p-nitroaniline nmoles per min and per ml |
| --- | --- | --- | --- |
| I | 66.7 | 0.167 | 5.6 |
| V | 66.2 | do. | 6.2 |
| VI | 67.4 | do. | 4.1 |
| VIII | 65.4 | do. | 7.6 |
| IX | 66.4 | do. | 3.4 |
| X | 58.2 | do. | 2.7 |
| XI | 65.1 | do. | 4.7 |
| XVIII | 66.9 | do. | 5.3 |
| XIX | 66.2 | do. | 2.1 |
| XX | 67.6 | do. | 2.1 |
| XXI | 65.6 | do. | 3.4 |
| XXII | 65.7 | do. | 2.2 |
| XXIII | 67.1 | do. | 5.4 |
| XXIV | 66.6 | do. | 2.5 |
| XXV | 66.4 | do. | 4.3 |
| XXVI | 64.7 | do. | 6.2 |
| XXXII | 69.0 | do. | 5.7 |

The Tables 1 – 6 clearly demonstrate the advantages of the enzyme substrates of the invention when compared with the amide substrate previously used for trypsin (BAPNA). By means of their greater sensitivity the new substrates make the determination of small amounts of enzyme possible without jeopardizing the exactness of the determination. This is very important from a clinical point of view, since it simplifies the collection of specimen.

The coagulation of the blood is a very complicated process, in which the transformation of fibrinogen to fibrin is enzymatically regulated by thrombin. Several of the other coagulation factors of the blood are in same manner coupled to thrombin by means of reactions. The enzyme substrates of the invention provide a possibility to determine these coagulation factors.

The following determination of antithrombin is based in principle upon the fact that a known amount of thrombin is added in excess to a specimen of plasma. The free antithrombin in the blood is bound to the added thrombin and the excess thrombin is then determined with the help of the enzyme substrate, after which the reacting amount of antithrombin may be calculated.

Determination of antithrombin

Venous blood is defibrinogenated and centrifuged. 0.5 ml of plasma is taken thereof and diluted with 2 ml of a buffer solution of trisimidazol. 0.1 ml of an aqueous thrombin solution (10 NIH = National Institute of Health) is then incubated with 0.25 ml of this plasma solution for exactly 5 min. at a temperature of 37°–40°C. 1 ml of a prewarmed buffer solution and 0.25 ml of an aqueous enzyme substrate solution (1 mg/ml) are added subsequently, and the mixture is incubated for exactly 1 min. at a temperature of 37°– 40°C. The reaction is then stopped with 0.25 ml of conc. acetic acid and the extinction is read at 405 nm on a spectrophotometer.

What is claimed is:

1. Substrate with high susceptibility to proteolytic enzymes of the type peptide peptidohydrolases, which substrate is represented by the formula:

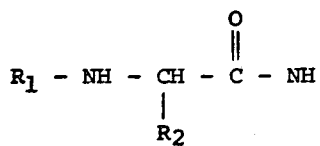

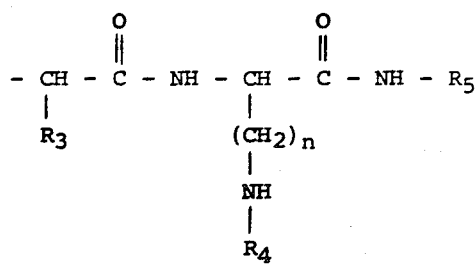

or acid addition salts thereof, where $R_1$ is selected from the group consisting of hydrogen, an alkyl-carbonyl having 1 –12 carbon atoms, a ω-aminoalkyl-carbonyl having 1–12 carbon atoms in a straight chain, cyclohexyl-carbonyl, a ω-cyclohexyl-alkyl-carbonyl having 1–6 carbon atoms in a straight chain, 4-aminoethyl-cyclohexylcarbonyl, benzoyl, benzoyl substituted with at least one substituent selected from the group consisting of halogen atoms, methyl, amino and phenyl, a ω-phenyl-alkyl-carbonyl having 1–6 carbon atoms in a straight chain, benzenesulphonyl, 4-toluenesulphonyl and $N^{\alpha}$-benzoyl-phenylalanyl; $R_2$ is selected from the group consisting of phenyl, benzyl, 4-hydroxybenzyl, 4-methoxybenzyl and 4-methylbenzyl; $R_3$ is selected from the group consisting of a straight, branched or cyclic alkyl having 3–8 carbon atoms, phenyl and benzyl; $n$ is selected from the group consisting of 3 and 4; $R_4$ is selected from the group consisting of hydrogen and quanyl; $R_5$ is selected from the group consisting of phenyl, nitrophenyl, methylnitrophenyl, naphthyl, nitronaphthyl, quinolyl and nitroquinolyl.

2. The substrate of claim 1 wherein $R_1$ is selected from the group consisting of hydrogen, acetyl, n-octanoyl, 4-aminobutyryl, 6-aminohexanoyl, cyclohexyl-carbonyl, 2-cyclohexylacetyl, 4-aminoethyl-cyclohexyl-carbonyl, benzoyl, p-methylbenzoyl, p-aminobenzoyl, 3-phenylpropionyl, 4-toluenesulphonyl.

3. The substrate of claim 1 wherein $R_1$ is benzoyl.
4. The substrate of claim 1 wherein $R_1$ is hydrogen.
5. The substrate of claim 1 wherein $R_2$ is benzyl.
6. The substrate of claim 1 wherein $R_2$ is phenyl.
7. The substrate of claim 1 wherein $n$ is 3 and $R_4$ is quanyl.
8. The substrate of claim 1 wherein $n$ is 4 and $R_4$ is hydrogen.
9. The substrate of claim 1 wherein $R_5$ is p-nitrophenyl.
10. The substrate of claim 1 wherein $R_5$ is naphthyl.
11. The substrate of claim 1 wherein $R_5$ is 4-nitronaphthyl
12. The substrate of claim 1 wherein $R_2$ is hydroxybenzyl.
13. The substrate of claim 1 which is $N^{\alpha}$-benzoyl-phenylalanyl-valyl-arginine-p-nitroanilide or the HCl salt thereof.
14. The substrate of claim 1 which is $N^{\alpha}$-benzoyl-phenylalanyl-leucyl-arginine-p-nitroanilide or the HCl salt thereof.
15. The substrate of claim 1 in which is $N^{\alpha}$-benzoyl-phenylalanyl-isoleucyl-arginine-p-nitroanilide or the HCl salt thereof.
16. The substrate of claim 1 which is phenylalanylphenylalanyl-arginine-p-nitroanilide or the HCl salt thereof.
17. The substrate of claim 1 which is $N^{\alpha}$-benzoyl-D-phenylalanyl-valyl-arginine-p-nitroanilide or the HCl salt thereof.
18. The substrate of claim 1 which is $N^{\alpha}$-benzoyl-D,L-phenylglycinyl-valyl-arginine-p-nitroanilide or the HCl salt thereof.
19. The substrate of claim 1 which is $N^{\alpha}$-benzoylphenylalanyl-valyl-arginine-2-naphthylamide or the HCl salt thereof.
20. The substrate of claim 1 which is $N^{\alpha}$-benzoyl-phenylalanyl-valyl-arginine-4-nitro-1-naphthylamide or the HCl salt thereof.
21. The substrate of claim 1 which is $N^{\alpha}$-benzoylphenylalanyl-valyl-lysyl-p-nitroanilide or the HCl salt thereof.

* * * * *